United States Patent [19]

Deering

[11] Patent Number: 5,394,202
[45] Date of Patent: Feb. 28, 1995

[54] METHOD AND APPARATUS FOR GENERATING HIGH RESOLUTION 3D IMAGES IN A HEAD TRACKED STEREO DISPLAY SYSTEM

[75] Inventor: Michael F. Deering, Los Altos, Calif.

[73] Assignee: Sun Microsystems, Inc., Mountain View, Calif.

[21] Appl. No.: 4,706

[22] Filed: Jan. 14, 1993

[51] Int. Cl.⁶ ...................... G03B 21/28; H04N 13/00
[52] U.S. Cl. ........................................ 353/7; 395/119; 395/122
[58] Field of Search .................. 353/7, 10, 28, 30, 37, 353/122; 434/43, 44; 359/13, 462, 471, 477, 479; 358/3, 88-90, 103-104; 395/119, 127, 122; 348/42, 51, 53, 169

[56] References Cited

U.S. PATENT DOCUMENTS

| | | | |
|---|---|---|---|
| 4,634,384 | 1/1987 | Neves et al. | 434/44 |
| 4,649,425 | 3/1987 | Pund | 358/88 |
| 4,922,336 | 5/1990 | Morton | 358/88 |
| 5,287,437 | 2/1994 | Deering | 395/127 |

Primary Examiner—William A. Cuchlinski, Jr.
Assistant Examiner—William C. Dowling
Attorney, Agent, or Firm—Blakely Sokoloff Taylor & Zafman

[57] ABSTRACT

A head tracked stereo display system for generating virtual images over a wide range of viewer head movement, and for intermixing light from virtual objects and real objects in a natural arrangement. The system comprises a display device disposed within a base housing and a mirror coupled to rotate around the display device, such that the mirror transmits the stereo images to a viewer. A tracking system controls the angular position of the mirror to transmit the stereo images to the viewer as the viewer moves. To intermix the light from real and virtual objects, the image rendering system generates a z buffer for the real objects. The real objects are rendered with no color. A half silvered mirror is positioned to transmit the stereo images to the eyes of a viewer, and transmit light reflected from the real objects to the eyes of the viewer. An LCD array panel selectively blocks transmission of the light reflected from the real object.

20 Claims, 4 Drawing Sheets

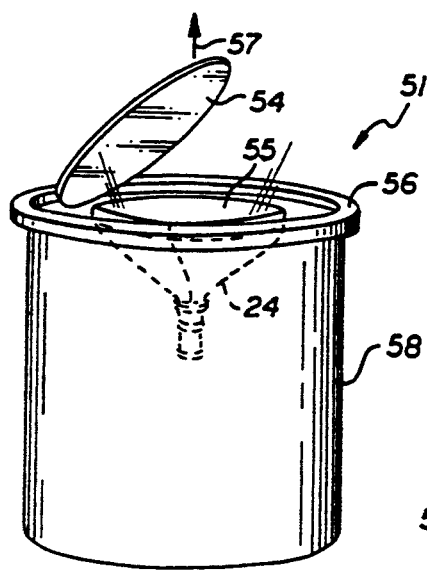
FIG. 4a
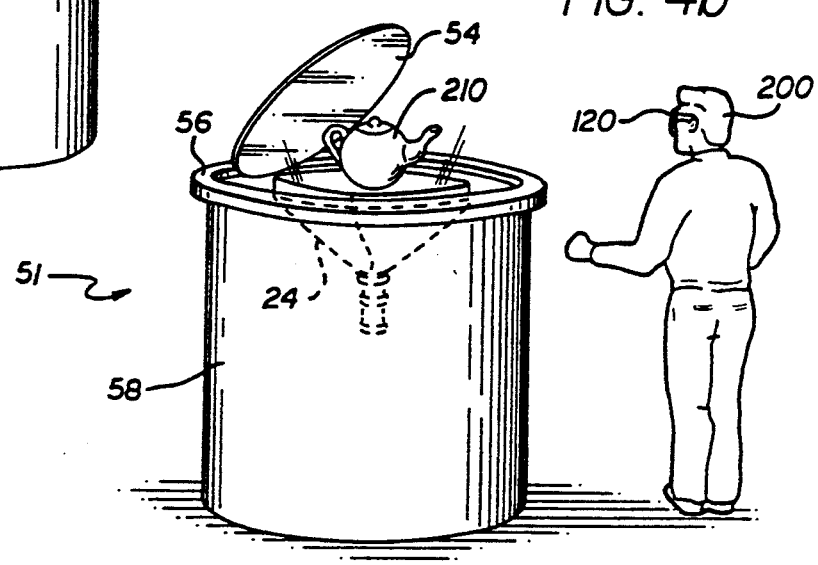
FIG. 4b
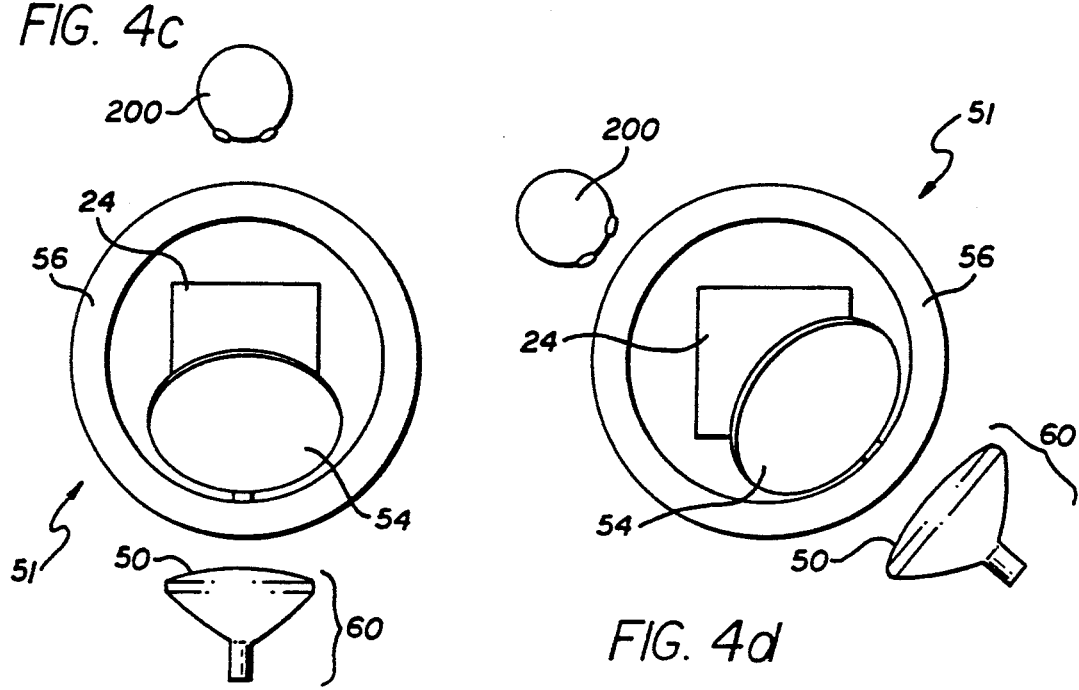
FIG. 4c
FIG. 4d

METHOD AND APPARATUS FOR GENERATING HIGH RESOLUTION 3D IMAGES IN A HEAD TRACKED STEREO DISPLAY SYSTEM

BACKGROUND OF THE INVENTION

1. Field of the Invention

This invention relates to the field of computer graphics systems. More particularly, this invention relates to generation of high resolution stereo 3D images in a head tracked stereo display system.

2. Art Background

The human eye can be modeled as an optical system coupled to a retina, with the retina functioning as a light transducer. The human eye is immersed in physical space filled with light rays. A point source of light exists at every point in the physical space that is a boundary between transparent and opaque surfaces, or a boundary between transparent surfaces of different refractive indices. Human stereo vision is achieved by immersing the two eyes at different locations within the physical space.

A head tracked stereo display system simulates the interaction of human eyes with the light rays of the physical space in order to enable a viewer to perceive 3D images. A head tracked stereo display system senses the location in physical space of the viewer's head and eyes, computes a pair of stereo images of a virtual object based upon the location of the head and eyes, and generates the stereo image on a stereo display device.

A head tracked stereo display system requires that only two images be computed and generated at a time, which results in substantially less computation than holographic systems. Moreover, the pair of stereo images have the same appearance as a hologram. With a head tracked stereo display system, the virtual object appears to remain stationary when the viewer's head tilts, or when the viewer's head moves to look around the side or over the top of the virtual object. For further discussion regarding head tracked stereo display systems, refer to Paley, W.B. *Head-tracking Stereo Display, Techniques and Applications*, Proceedings of SPIE, February 1992.

However, the range of head movement available to the viewer in previous head tracked stereo display systems is limited because the stereo display device remains stationary as the viewer's head moves. As the viewer's head moves around to the side of the virtual image rendered on the stereo display device, the virtual image becomes clipped due to the angled position of the viewer's head in relation to the display surface of the stereo display device.

Moreover, previous head tracked stereo display systems cannot intermix light from the virtual objects and light reflected from real objects in order to enable a viewer to perceive a natural arrangement for the real and virtual objects. If the viewer perceives the stereo images while facing the stereo display device, physical objects positioned between the stereo display device and the viewer's head block the light from the stereo display device and interrupt the virtual image.

As will be described, the present head tracked stereo display system generates complex 3D stereo images to enable a greater range of head movement for a viewer. Moreover, the present head tracked stereo display system intermixes light virtual and real objects to enable a viewer to perceive a natural arrangement for the real and virtual objects.

SUMMARY OF THE INVENTION

A method and apparatus is disclosed for generating high resolution 3D images in a head tracked stereo display system. The present method and apparatus enables a wide range of viewer head movements in a head tracked stereo display system. The present method and apparatus enables a viewer to perceive virtual objects superimposed over real objects for a wide range of viewer head movements. The present method and apparatus tracks viewer head movement and automatically adjusts display configuration and stereo viewing pipelines to enable a wide range of viewer head movement in a head tracked stereo display system.

The present method and apparatus also enables a viewer to perceive real objects and virtual objects in a natural arrangement. A viewer is able to perceive real objects positioned in front of virtual objects in three dimensional space. Moreover, the viewer is able to perceive virtual objects positioned in front of real objects in three dimensional space. The present method and apparatus renders real objects in a virtual space, and generates a z buffer for the real objects in order to intermix the light reflected from the real objects and light from virtual objects.

The present head tracked stereo display system employs a display device disposed within a base housing. The display device generates stereo images rendered by a graphics rendering system implemented on a computer. A mirror is coupled to rotate around the display surface of the display device, such that the mirror transmits the stereo images to a viewer. A tracking device coupled to the computer senses the movements of the viewer's head in three dimensional space. The computer controls the angular position of the mirror with a motor to transmit the stereo images to the viewer as the viewer moves. The image rendering system uses the angular position of the mirror to adjust the viewing matrices for reflection of the stereo images by the mirror.

To intermix the light from real and virtual objects, the computer maintains a data base of the location and dimensions in three dimensional space of the real objects. The image rendering system generates a z buffer indicating three dimensional positioning for the real objects. The real objects are rendered with no color. A half silvered mirror is positioned to transmit the stereo images to the eyes of a viewer, and transmit light reflected from the real objects to the eyes of the viewer. An LCD array panel selectively blocks transmission of the light reflected from the real object to the eyes of the viewer under control of the computer, such that the light reflected from portions of the real object obscured by the virtual object are blocked.

BRIEF DESCRIPTION OF THE DRAWINGS

FIGS. 4a–4d illustrate a rotating mirror apparatus for generating head tracked stereo images of virtual objects to enable a viewer to move around and perceive various perspective views of the virtual objects.

DETAILED DESCRIPTION OF THE INVENTION

A method and apparatus is disclosed for generating complex 3D stereo images to enable a greater range of head movement for a viewer and to intermix light from virtual and real objects to enable a viewer to perceive a natural arrangement for the real and virtual objects. In the following description for purposes of explanation, specific applications, numbers, apparatus and configurations are set forth in order to provide a thorough understanding of the present invention. However, it will be apparent to one skilled in the art that the present invention may be practiced without these specific details. In other instances, well known systems are shown in diagrammatical or block diagram form in order not to obscure the present invention unnecessarily.

Figure 1:
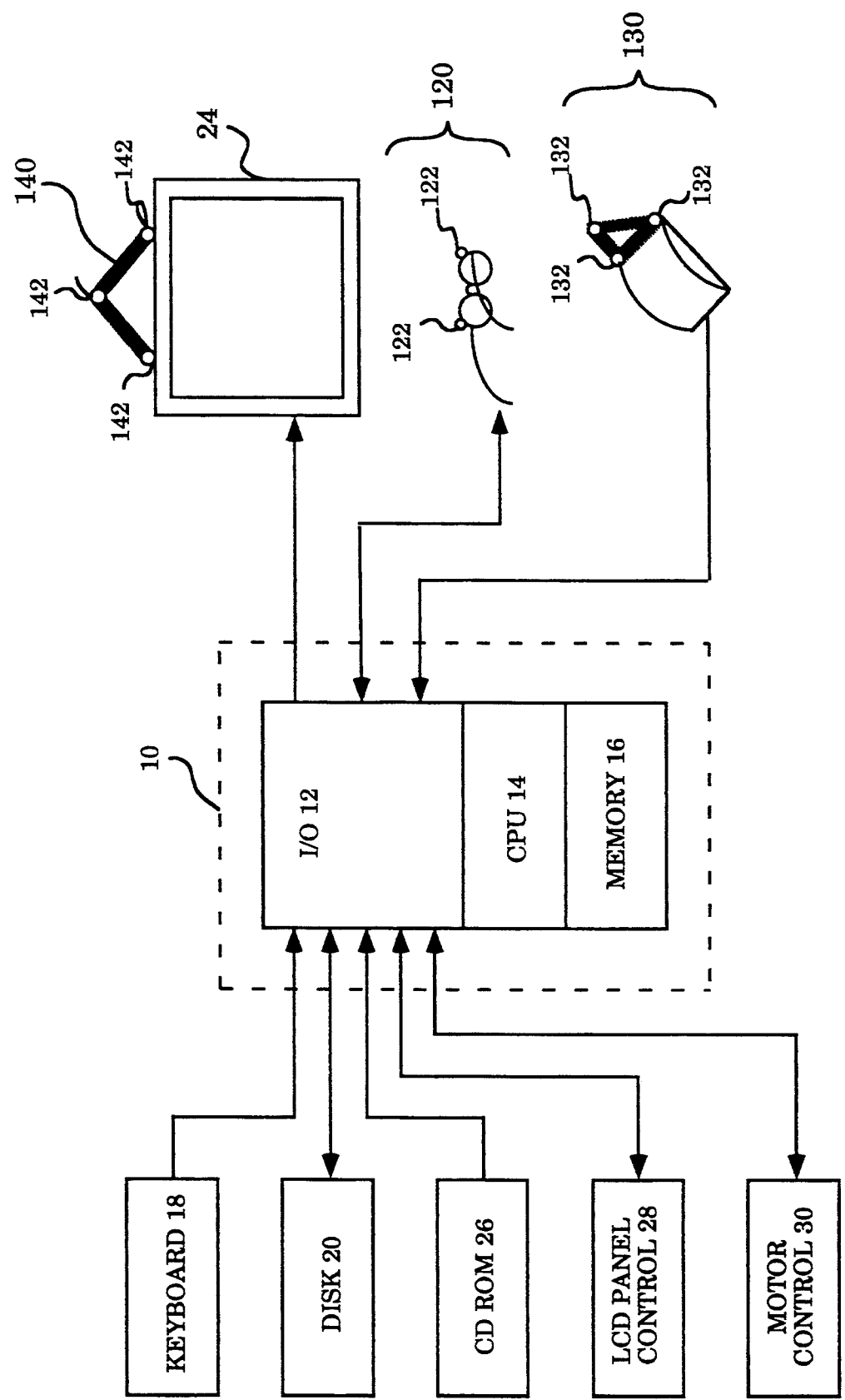
FIG. 1 illustrates a computer based system for generating graphic images and responding to a user's input in accordance with the teachings of the present invention.

Referring now to FIG. 1, an exemplary computer based system for generating graphic images and responding to a user's input in accordance with the teachings of the present invention is illustrated. A computer 10 comprised of three major components is shown. The first of these is an input/output (I/O) circuit 12 which is used to communicate information in appropriately structured form to and from other portions of the computer 10. In addition, the computer 10 includes a central processing unit (CPU) 14 coupled to the I/O circuit 12 and a memory 16. These elements are those typically found in most general purpose computers. The computer 10 is intended to be representative of a broad category of computer systems.

A magnetic disk 20 is shown coupled to the I/O circuit 12 to provide additional storage capability for the computer 10. As is well known, the disk 20 may store other computer programs, characters, routines, images, etc., which may be accessed and executed by the CPU 14. It will be appreciated that additional devices may be coupled to the computer 10 for storing data such as magnetic tape drives, as well as networks which are in turn coupled to other computer systems.

A CD ROM 20 is shown coupled to the I/O circuit 12 to provide an additional storage capability for distributing pre computed 3D stereo images in accordance with the teachings of the present invention. Also, an LCD panel controller 28 is shown coupled to the I/O circuit 12. The LCD panel controller 28 receives bit map data from the computer 10 to control the transparency of the pixels of an LCD panel array.

A motor control unit 30 is shown coupled to the I/O circuit 12. The motor control unit 30 enables the computer 10 to control a servo motor. Alternatively, the motor control unit 30 enables the computer 10 to control a stepper motor. As will be described, the servo motor or stepper motor controlled by the motor control unit 30 enables the computer 10 to control positioning of a rotating mirror to generate virtual images.

A raster display device 24 is shown coupled to the I/O circuit 12 and is used to display images generated by the CPU 14 in accordance to the teachings of the present invention. A wide variety of raster (or pixel mapped) display devices may be utilized as display device 24. In the current embodiment, the display device 24 comprises a stereo CRT. As is described more fully below, the display images generated by the CPU 14 through the display device 24 are perceived by a viewer through a mirror. Therefore, the CPU 14 generates the display image so as to reverse the left and right positions of the pixels comprising the image. The mirror again reverses the left and right positions to enable the viewer to properly perceive the image.

A keyboard 18 is shown coupled to the I/O circuit 12 and is used to input data and commands into the computer 10, as is well known. A pair of stereo shuttered glasses 120 is shown coupled to the I/O circuit 12. The stereo shuttered glasses 120 include a pair of embedded ultrasonic receivers 122 for receiving ultrasonic sound waves. The stereo shuttered glasses also have embedded an infrared controlled switch for controlling the shuttered lenses.

A 3D 6-axis mouse 130 is shown coupled to the I/O circuit 12. The 3D mouse 130 includes a set of three ultrasonic receivers 132 for receiving ultrasonic sound waves. The 3D positions of the 3D mouse 130 and the shuttered glasses 120 are sensed by a 3D 6-axis head-tracker 140, which for one embodiment is mounted to the stereo CRT 24. The 3D ultrasonic tracking device 140 has embedded three ultrasonic transmitters 142 that generate the ultrasonic sound waves received by the ultrasonic receivers 122 and 132.

Figure 2:
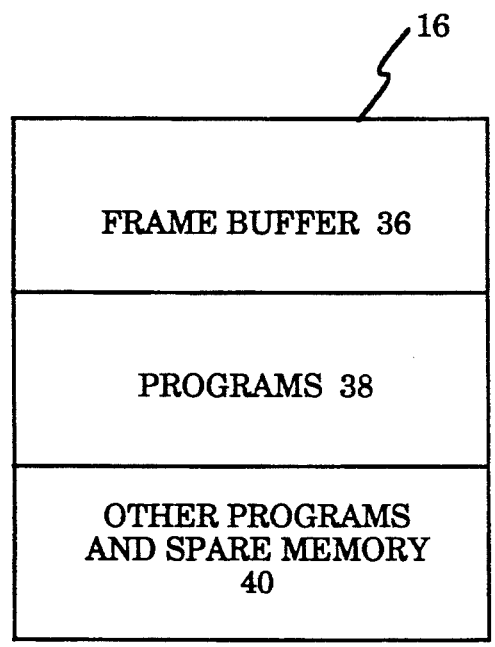
FIG. 2 illustrates an arrangement of major programs and storage areas contained within the memory 16 illustrated in FIG. 1.

Referring now to FIG. 2, one arrangement of major programs contained within the memory 16 illustrated in FIG. 1 is shown. In particular, there is shown a frame buffer 36, which serves as a pixel map of the display 24. The frame buffer 36 represents the video memory for the display 24, wherein, each storage location in the frame buffer 36 corresponds to a left or right eye pixel on the stereo CRT 24. Thus, the frame buffer 36 comprises a two dimensional array of points having known coordinates corresponding to the pixels on the stereo CRT 24. The frame buffer 36 is preferably arranged as a double buffer, such than an image can be accessed from one buffer while another image is being displayed from the other buffer.

The memory 16 also comprises a variety of programs executed by the CPU 10 that implement functions according to the teaching of the present invention, as disclosed in this specification. Additionally, the memory 16 further comprises other programs for controlling or performing other well known functions and operation on computer systems.

For one embodiment, the viewer wears the stereo shuttered glasses 120, and may manipulate the 3D 6-axis mouse 130. The 3D positions of the 3D mouse 130 and the shuttered glasses 120 are sensed by a 3D 6-axis headtracker 140. The travel time of the ultrasonic sound waves, between the ultrasonic receivers 122 and 132 and the ultrasonic transmitters 142, are used to triangulate the 3D positions of the shuttered glasses 120 and the 3D mouse 130. The 3D mouse 130 is used to manipulate a virtual image perceived by the viewer.

In a head tracked stereo display system, a stereo viewing display pipeline is specified by two 4×4 perspective viewing matrices (effectively, one monocular pipeline for each eye). These matrices implicitly contain information about the overall physical configuration of the viewing. Each resulting matrix includes a skew component.

The physical configuration of the viewing is determined by the location of the display surface in 3-space and the dynamic location of the viewer's eyes. When these parameters are known, the viewing matrices are unique to within a scale factor. The viewing matrix for each eye corresponds to a pyramid having a tip at the viewer's eye and a base defined by the four corners of the display window within the display surface. The front and back clipping planes are parallel to the plane of the display surface, if the display surface is assumed to be perfectly flat.

In the current embodiment, a computer graphics application specifies the relationship between physical coordinates and virtual coordinates (VC) by a matrix P. The relative position, orientation, and scale implied by the matrix P specify how the virtual and physical worlds are to be superimposed. (This scale factor is denoted g). The physical configuration of the stereo display device and the sensed real time location of the viewer's eye's contribute the remainder of the information necessary to the final 4×4 viewing matrices. The final 4×4 viewing matrices are used a parameters for the graphics rendering system implemented on the computer 10.

To implement the teachings of the present invention, the stereo CRT 24 is regarded as having a physical coordinate system registered to its display surface. This physical coordinate system is hereinafter referred to as display plate coordinates (DPC).

Figure 3:
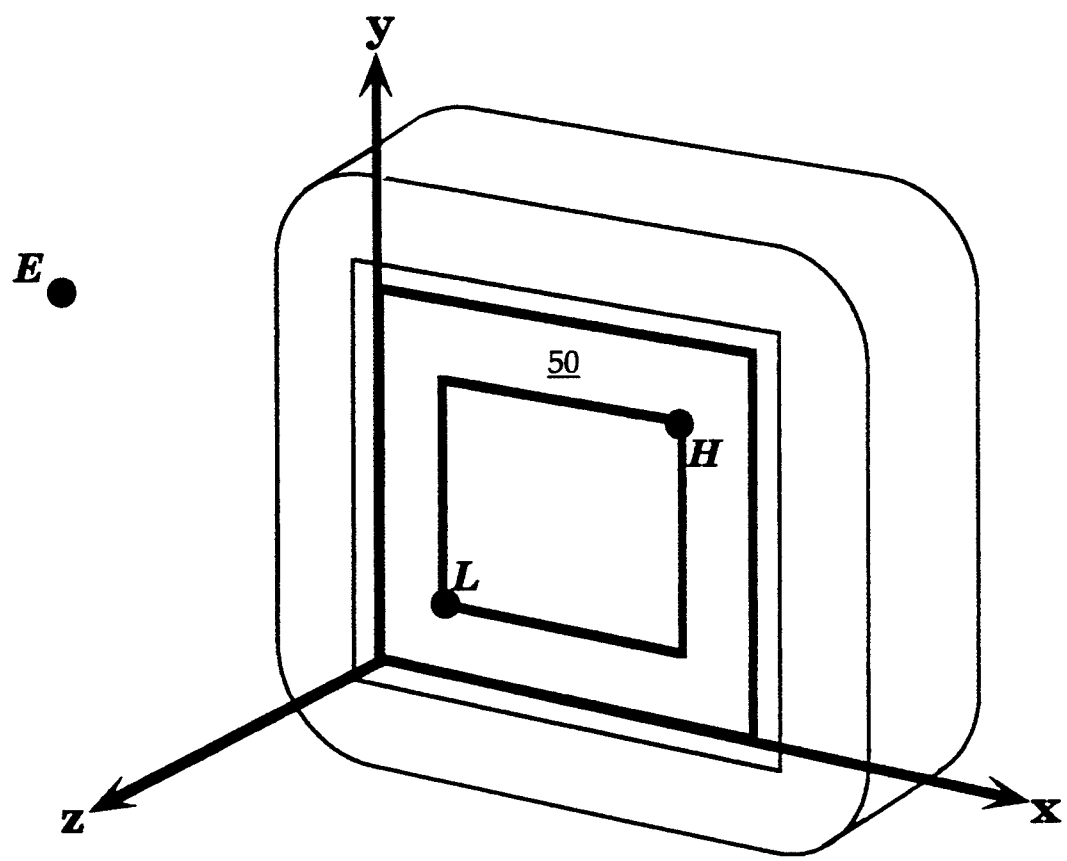
FIG. 3 illustrates an example display plate coordinate system, which has its origin at the lower left hand corner of the visible portion of a display surface of the stereo CRT.

Referring to FIG. 3, an example DPC coordinate system is illustrated. DPC has its origin at the lower left hand corner of the visible portion of a display surface of the stereo CRT 24. The x axis proceeds horizontally to the right. The y axis proceeds vertically upwards. The z axis is normal to the virtual display surface, with positive coordinates out towards the viewer.

A window on the virtual display surface 50 is defined by specifying a lower left hand and an upper right hand corner for the window as two DPC points L and H on the z=O plane. Each of the viewer's eyes has a separate coordinate in the DPC space. An example coordinate of a single eye point is denoted E. The front and back clipping planes are given by a distance F and B along the z axis.

The view matrix P for a single eye, expressed in column vector matrix format, that maps visible points in DPC into the extended unit cube of $[-1+1][-1+1][-1+1]$, is as follows:

The equations above apply to display devices such as the stereo CRT 24, as well as projection stereo displays and stereo LCD panels. It should be noted that the intraocular distance, which is the distance between the viewer's eyes, is not directly represented in the view matrix P.

In a head-tracking display system, parallax on the display surface is not necessarily horizontal. If a viewer observes the display with eyes oriented vertically, then the parallax at the screen will be completely vertical. The amount of parallax at the screen is not consistent even for a given head distance and object location. When a viewers head is turned 30° to one side of the screen, the parallax at the screen surface is less than when the screen is squarely faced.

In traditional computer graphics, the viewing projection point is referred to as the "eye point" or "viewpoint" and is intended to correspond to the viewer's eye. However, for the purposes of accurate display, the viewpoint location must be accurately identified physiologically. In general optical terms, the viewpoint of a lens system is the first nodal point.

Accurate viewpoint location for the nodal points of the eye can be achieved by using eye tracking hardware to acquire information about the direction of gaze of each of the viewer's eyes. The combination of gaze information and head and eye location can be used to accurately locate the eye first nodal points in the DPC space. In addition, the gaze direction information can be used for identifying the region of the display surface space that corresponds to the fovial portion of the retina, and that deserves to be rendered with high spatial detail.

Alternatively, errors due to uncertainty in eye first nodal point location can be minimized by anticipating the likely direction of the viewer's gaze. The likely direction of the viewer's gaze may be the center of the stereo window on the virtual display surface 50. When the 3D mouse 130 is employed, the viewer's gaze is likely to be in the direction of the "hot spot" of an interactive virtual image, as it is likely that the tightest accuracy requirement reflects "touching" the mouse to a virtual object. Choosing the direction of the viewer's gaze at the tip of the 3D mouse 130 compensates for errors due to rotation of the eyes. Moreover, the image rendering software implemented on the computer 10 maintains DPC coordinates for the "hot spot" of the stereo image displayed on the virtual display surface 50.

The current embodiment of the present invention employs an ultrasonic tracking device 140 to acquire dynamic viewer head location and orientation within the DPC space. However, it should be noted that the present method does not depend on the tracking technology used. Head location and orientation data is used to derive the rotational centers of the viewer's eyes in $$P = \begin{bmatrix} \dfrac{2 \cdot E_z}{H_x - L_x} & 0 & \dfrac{H_x + L_x - 2 \cdot E_x}{H_x - L_x} & \dfrac{-E_z \cdot (H_x + L_x)}{H_x - L_x} \\ 0 & \dfrac{2 \cdot E_z}{H_y - L_y} & \dfrac{H_y + L_y - 2 \cdot E_y}{H_y - L_y} & \dfrac{-E_z \cdot (H_y + L_y)}{H_y - L_y} \\ 0 & 0 & \dfrac{B + F - 2 \cdot E_z}{B - F} & B - E_z - B \cdot \dfrac{B + F - 2 \cdot E_z}{B - F} \\ 0 & 0 & -1 & E_z \end{bmatrix}$$

real time using fixed vectors from the location of the ultrasonic tracking device 140 to the viewer's eyes.

The intraocular distance of a viewer's head can very between individuals by as much as ±2 cm. In the current embodiment, the fixed vectors from the ultrasonic tracking device 140 to the viewer's eyes are viewer specific in order to account for the intraocular distance of a given viewer. The fixed vectors also account for the registration of the head tracking device to the viewer's head.

In order for viewer to perceive computer generated objects as three dimensional physical objects, it is necessary to have a display frame rate sufficient for motion fusion. With stereo imagery there is the additional phenomenon of induced stereo movement, wherein objects displayed at a low frame rate appear to deform and twist. For further discussion, refer to Tyler, C. W., *Induced Stereo movement, Vision Res.*, Vol 14, 609–613, Pergamon Press, 1974.

FIG. 4a illustrates a rotating mirror apparatus 51 for generating head tracked stereo images of virtual objects. The rotating mirror apparatus 51 enables a viewer to move around and perceive various perspective views of the virtual object or objects. The stereo CRT 24 is embedded within a cylindrical shaped housing 58. The stereo CRT 24 is substantially centered along the axis of the cylindrical housing 58. A display surface 55 of the stereo CRT 24 protrudes through the upper end of the cylindrical housing 58. A mirror 54 is coupled to a rotating platform 56. For one embodiment, the mirror 54 forms a 45 degree angle with respect to the display surface 55 of the stereo CRT 24.

For one embodiment, a stepper motor (not shown) causes the rotating platform 56 to revolve around the center axis 57 of the cylindrical housing 58. The stepper motor is coupled to the motor control unit 30. The motor control unit 30 is coupled to receive control information from the computer 10. The computer 10 causes the stepper motor to control the angular position of the rotating platform 56, and thereby control the angular position of the mirror 54.

FIG. 4b illustrates the rotating mirror apparatus 51 for generating a 3D head tracked stereo image of a virtual object 210. The viewer 200 wears the shuttered glasses 120. The 3D position of the shuttered glasses 120 is sensed by the ultrasonic tracking device 140. For one embodiment, the ultrasonic tracking device 140 is mounted to the rotating platform 56 because ultrasonic sound waves have limited range and require line of sight paths between the ultrasonic tracking device 140 and the shuttered glasses 120. For an alternative embodiment, a tracing device having extended range and not requiring line of sight paths is mounted to the stereo CRT 24.

For one embodiment, the computer 10 senses the travel time of the ultrasonic sound waves between the ultrasonic transmitters 142 and the microphones 122. Based upon the travel time, the computer 10 triangulates the 3D positions of the shuttered glasses 120. The computer 10 corrects for the speed of sound given the air temperature and other factors to triangulate the 3D position of the shuttered glasses 120.

The computer 10 tracks the 3D position of the head of the viewer 210 by tracking the 3D position of the shuttered glasses 120. As the viewer 200 moves around the rotating mirror apparatus, the computer 10 adjusts the rotational angle of the mirror 54 such that the mirror 54 maintains an angular position facing the viewer 200.

The computer 10 and the motor control unit 30 implement a stabilizing control process that limits movement of the rotating platform 56 to major head movements of the viewer 200. For one embodiment, the computer 10 and the motor control unit 30 implement dynamic Kalman filtering for stabilization control.

As the computer 10 adjusts the rotational angle of the mirror 54 to track movement of the viewer 200, the computer control effectively causes the mirror 54 to follow the averaged location of the head of the viewer 200 over a short time interval.

An image rendering system implemented on the computer 10 generates stereo images on the stereo CRT 24. The stereo images on the display surface 55 of the stereo CRT 24 are reflected by the mirror 54. The mirror 54 reflects the stereo images toward the viewer 200 wearing the shuttered glasses 120. The viewer 200 perceives the reflected stereo images as a virtual object 210. The virtual object 210 appears transparent to the viewer 200 if the mirror 54 is a half silvered mirror. If the mirror 54 is a solid mirror, the virtual object 210 appears solid to the viewer 200.

To the viewer 200, the virtual object 210 appears to be generated by a reflection of the stereo CRT 24 positioned behind the mirror 54. As the computer 10 rotates the mirror 54 to track the movements of the viewer 200, the reflection of the stereo CRT 24 moves within the DPC space accordingly. It will be appreciated that the reflection of the stereo CRT 24 appears to turn about the vertical axis 57 as the mirror 54 rotates.

FIGS. 4c–4d illustrate the changing positions of a reflection 60 of the stereo CRT 24 as the mirror 54 rotates in order to track the movements of the viewer 200. A top view of the rotating mirror apparatus 51 is shown, including the rotating platform 56, the stereo CRT 24, and the rotating mirror 54. Also illustrated is a reflected display surface 50 of the stereo CRT 24 as perceived by the viewer 200 through the mirror 54.

FIG. 4c illustrates the position of the reflection 60 of the stereo CRT 24 for an example position of the viewer 200 in relation to the rotating mirror apparatus 51. FIG. 4d illustrates the position of the reflection 60 of the stereo CRT 24 for another example position of the viewer 200 in relation to the rotating mirror apparatus 51.

The computer 10 determines the 3D position of the reflection 60 of the stereo CRT 24 from the rotational angle of the rotating platform 56. The computer 10 adjusts viewing matrices corresponding to the eyes of the viewer 200 in order to position the display surface of the stereo CRT 24 at the position of the display surface 50 of the reflection 60 of the stereo CRT 24. Therefore, the DPC space is registered to the display surface 50 of the reflection of the stereo CRT 24 as the virtual objects are mapped into the virtual space. Moreover, the computer 10 performs a top-bottom reversal of the coordinates of the stereo images on the display surface of the stereo CRT 24 to compensate for the reflection of the stereo images in the mirror 54.

Figure 5:
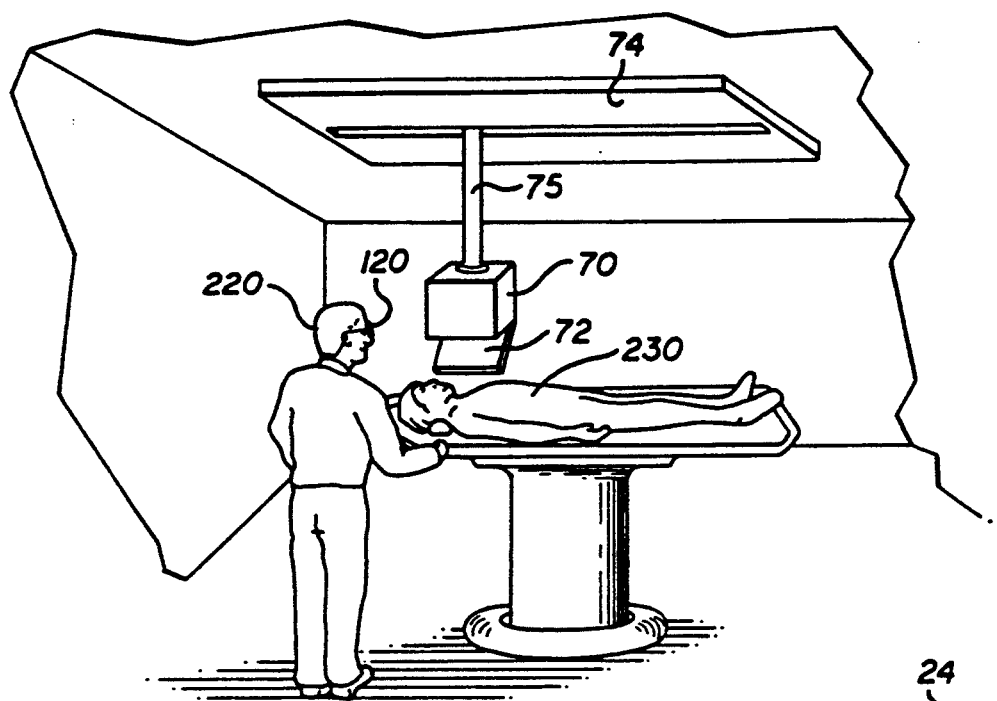
FIG. 5 shows an alternative embodiment of a rotating mirror apparatus for generating a 3D head tracked stereo image superimposed over a real object.

FIG. 5 illustrates an alternative embodiment of a rotating mirror apparatus for generating a 3D head tracked stereo image superimposed over a real object. In the example shown, the rotating mirror apparatus enables a viewer 220 to perceive a virtual image superimposed over a surgical patient 230. The virtual image is a 3D image of the surgical patient derived from a computer aided tomography (CAT) scan.

A stereo CRT 70 is rotatably coupled to a ceiling mounted track 74. The ceiling mounted track enables translation of the position of the stereo CRT 70 along two dimensions parallel to the ceiling plane. A half silvered mirror 72 is mounted to the stereo CRT 70. For one embodiment, the half silvered mirror 72 forms a 45 degree angle with respect to the display surface of the stereo CRT 70. The computer 10 actuates a stepper motor (not shown) to rotate the stereo CRT 70 and the mirror 72 about an axis defined by the vertical shaft 75.

The viewer 220 wears the stereo shuttered glasses 120. The ultrasonic tracking device 140 senses the 3D position of the shuttered glasses 120. For one embodiment, the ultrasonic tracking device 140 is mounted to the stereo CRT 70. The computer 10 tracks the 3D position of the head of the viewer 220 by sensing the 3D position of the shuttered glasses 120. As the viewer 220 moves, the computer 10 actuates the stepper motor to adjust the rotational angle of the stereo CRT 70 in order to maintain the mirror 72 facing the viewer 220.

As the computer 10 adjusts the rotational angle of the stereo CRT 70 and the mirror 72 to track movement of the viewer 220, a computer filtered control effectively causes the mirror 72 to follow the averaged location of the head of the viewer 220 over a short time interval.

An image rendering system implemented on the computer 10 generates stereo images on the stereo CRT 70. The stereo images on the display surface of the stereo CRT 24 are reflected by the mirror 72. The mirror 72 reflects the stereo images toward the viewer 220 wearing the shuttered glasses 120. The viewer 220 perceives the reflected stereo images as a virtual image of a CAT scan. The virtual image appears transparent to the viewer 220 since the mirror 72 is a half silvered mirror.

To the viewer 220, the virtual image of the CAT scan appears to be generated by a reflection of the stereo CRT 70 positioned behind the mirror 72. As the computer 10 rotates the stereo CRT 70 and the mirror 72 to track the movements of the viewer 220, the reflection of the stereo CRT 70 moves within the DPC space accordingly.

The computer 10 determines the 3D position of the reflection of the stereo CRT 70 from the rotational angle of the stereo CRT 70 around the vertical shaft 75 and from the x-y motion of the shaft. The computer 10 adjusts viewing matrices corresponding to the eyes of the viewer 220 in order to position the display surface of the stereo CRT 70 at the position of the display surface of the reflection of the stereo CRT 70. The DPC space is registered to the display surface of the reflection of the stereo CRT 70 as the virtual image is mapped into the virtual space. Moreover, the computer 10 performs a top-bottom reversal of the coordinates of the stereo images on the display surface of the stereo CRT 70 to compensate for the reflection of the stereo images in the mirror 72.

Figure 6:
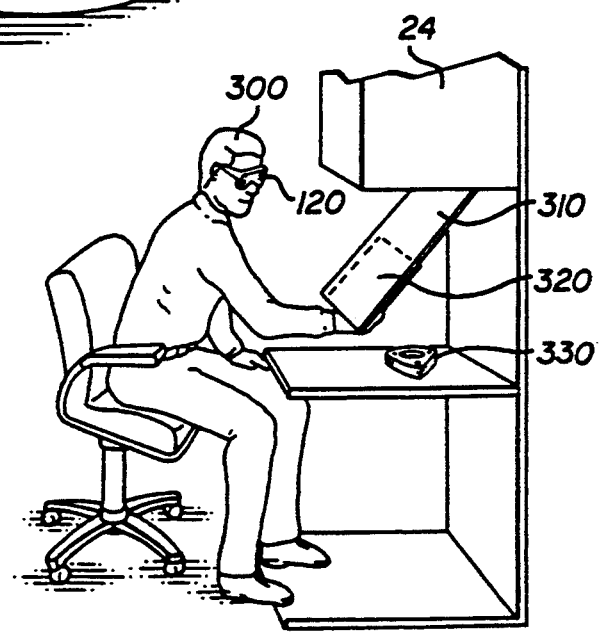
FIG. 6 illustrates a head tracked stereo display system that enables a viewer to perceive an arrangement of virtual objects and real objects such that real objects obscure virtual objects and virtual objects obscure real objects in a natural manner.

FIG. 6 illustrates a head tracked stereo display system that enables a viewer to perceive an arrangement of virtual objects and real objects. The stereo CRT 24 is shown mounted in an inverted position such that stereo images generated on the stereo CRT 24 are reflected by a mirror 310. The mirror 310 is a half silvered mirror. A viewer 300 wears the stereo shuttered glasses 120. The ultrasonic tracking device 140 (not shown) is mounted to the stereo CRT 24.

To the viewer 300, the stereo images on the stereo CRT 24 appear to be generated by a reflection of the stereo CRT 24 positioned behind the mirror 310. As a consequence, the computer 10 adjusts viewing matrices corresponding the eyes of the viewer 300 in order to position the display surface of the stereo CRT 24 at the position of the display surface of the reflection of the stereo CRT 24. Therefore, the DPC space is registered to the display surface of the reflection of the stereo CRT 24 as the virtual objects are mapped into the virtual space. Also, the computer 10 performs a top-bottom reversal of the coordinates of the stereo images on the display surface of the stereo CRT 24 to compensate for the reflection of the stereo images in the mirror 310.

The computer 10 uses the ultrasonic tracking device 140 to sense the 3D position of the head of the viewer 300. Thereafter, the image rendering system on the computer 10 generates stereo images on the stereo CRT 24 to render the virtual objects behind the half silvered mirror 310. The viewer 300 wearing the stereo shuttered glasses 120 perceives the reflected stereo images as one or more virtual objects positioned behind the half silvered mirror 310. The half silvered mirror 310 also enables the viewer 300 to perceive a real object 330 positioned behind the half silvered mirror 310.

The computer 10 maintains a physical object data base indicating the 3D geometry of the real object 330, and indicating the physical location of the real object 330. The real object 330 is modeled as a black object, i.e. no color, in the physical object data base. The image rendering system of the computer 10 renders the physical object 330 in the virtual space in order to generate z buffer values for the physical object 330.

If a physical object is positioned within the DPC space in front of a virtual object from the point of view of the viewer 300, the z buffer of the image rendering system of the computer 10 causes no light to be emitted from the stereo CRT 24 for portions of the virtual object obscured by the real object. In this manner, the viewer 300 perceives the virtual object to be behind the real object.

On the other hand, if a physical object is positioned within the DPC space behind a virtual object from the point of view of the viewer 300, an LCD array panel 320 is employed to obscure portions of the physical object that are behind the virtual object. The LCD array panel 320 is positioned over the half silvered mirror 310. The computer 10 controls the array of LCD pixels comprising the LCD array panel 320. The computer 10 causes the LCD array panel 320 to selectively block light from passing through the half silvered mirror 320 to the viewer 300. The computer 10 causes the LCD array panel 320 to block portions of the physical object that are behind the virtual object. As a result, the viewer 300 perceives the virtual object to be in front of the real object.

Figure 7:
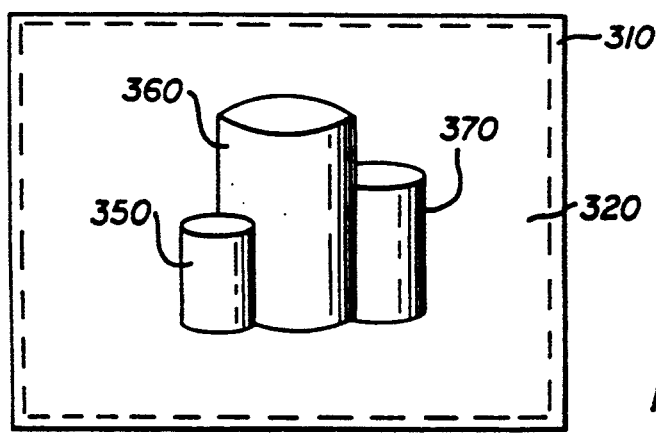
FIG. 7 shows an arrangement of virtual objects and real objects generated by the head tracked stereo display system of FIG. 6.

FIG. 7 shows an arrangement of virtual objects and real objects generated by the head tracked stereo display system of FIG. 6. A virtual object 350, a real object 360, and a virtual object 370 are perceived by the viewer 300. The computer 10 generates the virtual objects 250 and 370 by generating stereo images on the stereo CRT 24, which are reflected by the half silvered mirror 310 as previously discussed. The real object 360 is positioned behind the half silvered mirror 310 in relation to the viewer 300. Light reflected from the real object 360 passes through the half silvered mirror 310, and is perceived by the viewer 300. The computer 10 causes the LCD array panel 320 to selectively block light reflected from the real object 360.

The physical object data base indicates the 3D geometry of the real object 360, and indicates the physical location in the DPC space of the real object 360. The real object 360 is modeled as a black object in the physical object data base. The image rendering system of the computer 10 renders the physical object 360 in the virtual space in order to generate z buffer values for the physical object 360.

The real object 360 is positioned within the DPC space in front of the virtual object 370 from the point of view of the viewer 300. As illustrated, the z buffer of the image rendering system of the computer 10 causes no light to be emitted from the stereo CRT 24 for portions of the virtual object 370 obscured by the real object 360. Thus, the viewer 300 perceives the virtual object 370 to be positioned behind the real object 360.

The real object 360 is positioned within the DPC space behind the virtual object 350 from the point of view of the viewer 300. As illustrated, the computer 10 causes the pixels of LCD array panel 320 corresponding to portions of the physical object 360 that are behind the virtual object 350 to block light from the physical object 360. Light from the stereo images on the stereo CRT 24 is reflected by the half silvered mirror 310. As a result, the viewer 300 perceives the virtual object 350 to be positioned in front of the real object 360.

The real object 360 positioned behind the mirror 310 appears to be in front of the virtual object 370 if a model of the real object 360 has been rendered within the DPC space at the proper distance, size, and orientation, with a completely black color. Rendering of the real object 360 in the DPC space causes no light to be emitted from the stereo CRT 24 (beyond the minimum black level). As a consequence, the only changing light coming from the portion of the viewers gaze corresponding to the real object 360 is the light from the real object 360.

The virtual object 350 appears to be in front of the real object 360, but only as a transparent object unable to occlude the images of the real object 360. The range of transparency is limited by the configuration of the mirror 310. The virtual object 350 exhibits the least amount of transparency when rendered at full intensity. The degree of transparency depends upon the percentage of reflected versus transmitted light from the mirror 310. The virtual object 350 exhibits higher degrees of transparency for any particular mirror when rendered at a lower intensity.

The LCD array panel 320 enables the computer 10 to control the amounts of transmitted versus reflected light perceived by the viewer 300. The LCD array panel 320 is positioned on the far side of the half silvered mirror 310 from the viewer 300. The LCD array panel 320 controls the amount of directly transmitted light from the real object 360 to the viewer 300. The LCD array panel 320 controls transfer of light on a per pixel basis.

The LCD array panel 320 controls light transfer in two modes. In binary mode, the LCD array panel 320 transfers all or none of the light from real object 360 on a per pixel basis. In "alpha" mode, a percentage of light from the real object 360 is transferred. The percentage of light transferred is set to a fractional amount per pixel (within the LCD's dynamistic range, update rates, etc.) The binary mode is an extreme version of the alpha mode in which the control value "alpha" can take on only the values of 0 or 1.

In binary mode, the virtual object 350 can occlude the real object 360. To accomplish this, an alpha frame buffer storage bit is maintained by the computer 10 for each pixel of the LCD array panel 320. When rendering the virtual object 350, the alpha values corresponding to the virtual object 350 are set to 1 (i.e. no physical object light passes through the LCD array panel 320). The alpha values corresponding to the "black" model of the real object 360 are set to 0.

When z-buffering is performed by the computer 10 for the virtual object 350 and the real object 360, the closest object type (real or virtual) at each pixel will set the alpha bit to the proper value as outlined above. The alpha image is displayed on the LCD array panel 320, causing the proper light valving effects. A form of transparency is rendered for both real and virtual objects by "screen-door" transparency methods.

In alpha mode, transparency is performed by controlling the amount of light passing through each pixel of the LCD array panel 320. The computer 10 implements a rendering method that sets the appropriate fractional alpha value in the frame buffer to control the transparency of the LCD array panel 320. The alpha mode enables the viewer 300 to perceive a transparent virtual object 350 in front of the real object 360 (solid or transparent). The alpha mode also enables the viewer 300 to perceive a transparent real object 360 (like a glass) in front of the virtual object 370 (solid or transparent).

The value chosen for alpha may be a constant for a given object, or a complex function computed according to the real or simulated optical properties of the real or virtual object, respectively. Complex effects, such as the viewer 300 perceiving a magnified virtual object through a real magnifying glass can be performed. Alternatively, the real objects can be digitized and transferred to the computer 10, such that the computer 10 performs the appropriate optical simulations and effects. The computer 10 completely replaces a physical object with a doppenganger virtual object. Thus, in the apparatus of FIG. 6, some physical objects have pure black virtual counterparts, while some physical objects are replaced with non-black virtual copies by setting the corresponding alpha values to 1.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are accordingly to be regarded as illustrative rather than restrictive.

What is claimed is:

1. An apparatus for generating an accurate stereo three dimensional image, comprising:

display device comprising a stereo CRT having a display surface for generating stereo images rendered by a computer means;

reflector means coupled to rotate around the display surface of the display device and reflect the stereo images, such that the reflector means transmits the stereo images to a viewer;

means for positioning the reflector means under control of the computer means, such that the reflector means tracks movement of the viewer, thereby continuously transmitting the stereo images to the viewer, wherein the reflector means comprises a mirror, the mirror positioned to form a substantially forty five degree angle in relation to the display surface of the display device as the mirror rotates around the display surface.

2. The apparatus of claim 1, wherein the mirror comprises a half silvered mirror.

3. The apparatus of claim 1, wherein the means for positioning the reflector means under control of the computer means comprises:
  means for sensing a three dimensional position of the eyes of the viewer;
  motor means coupled to move a rotating platform, the reflector means coupled to the rotating platform, the motor means rotating an angular position of the rotating platform to track the three dimensional position of the eyes of the viewer.

4. The apparatus of claim 1, further comprising means for moving the display device and the reflector means along a two dimensional plane under control of the computer means, such that the display device and the reflector means track the viewer and transmit the stereo images to the viewer.

5. An apparatus for generating an accurate stereo three dimensional image of a virtual object intermixed with a real object, comprising:
  display device having a display surface for generating stereo images rendered by a computer means, the stereo images corresponding to a virtual coordinate space, the computer means generating a z buffer indicating three dimensional positioning for the real object and the virtual object within the virtual coordinate space;
  reflector means positioned to transmit the stereo images to the eyes of a viewer, the reflector means further transmitting light reflected from the real object to the eyes of the viewer;
  means for selectively blocking transmission of the light reflected from the real object to the eyes of the viewer under control of the computer means.

6. The apparatus of claim 5, wherein the display device comprises a stereo CRT.

7. The apparatus of claim 5, wherein the reflector means comprises a half silvered mirror, such that the mirror forms a substantially forty five degree angle in relation to the display surface of the display device.

8. The apparatus of claim 5, wherein the means for selectively blocking transmission of the light reflected from the real object comprises an LCD array panel positioned adjacent to the reflector means opposite the viewer.

9. The apparatus of claim 5, wherein the means for selectively blocking transmission of the light blocks transmission of light on a per pixel basis according to a plurality of alpha values determined by the computer means, wherein each alpha value corresponds to a pixel.

10. The apparatus of claim 9, wherein the computer means determines the alpha values by rending the real object and the virtual object in the virtual coordinate space, and by performing z-buffering on the rendered real and virtual objects.

11. A method for generating an accurate stereo three dimensional image, comprising the steps of:
  generating stereo images on a display surface of a display device comprising a stereo CRT, the stereo images rendered by a computer means;
  reflecting the stereo images with a reflector means coupled to rotate around the display surface of the display device, such that the reflected stereo images are transmitted to a viewer;
  positioning the reflector means under control of the computer means, such that the reflector means tracks movement of the viewer, thereby continuously transmitting the stereo images to the viewer, wherein the reflector means comprises a mirror, the mirror positioned to form a substantially forty five degree angle in relation to the display surface of the display device as the mirror rotates around the display surface.

12. The method of claim 11, wherein the step of reflecting the stereo images comprises the step of reflecting the stereo images in a half silvered mirror.

13. The method of claim 11, wherein the step positioning the reflector means under control of the computer means comprises the steps of:
  sensing a three dimensional position of the eyes of the viewer;
  rotating an angular position of the reflector means to track the three dimensional position of the eyes of the viewer.

14. The method of claim 11, further comprising the step of moving the display device and the reflector means along a two dimensional plane under control of the computer means, such that the display device and the reflector means track the viewer and transmit the stereo images to the viewer.

15. A method for generating an accurate stereo three dimensional image of a virtual object intermixed with a real object, comprising the steps of:
  generating stereo images rendered by a computer means on a display surface of a display device, the stereo images corresponding to a virtual coordinate space, the computer means generating a z buffer indicating three dimensional positioning for the real object and the virtual object within the virtual coordinate space;
  reflecting the stereo images to the eyes of a viewer, and transmitting light reflected from the real object to the eyes of the viewer;
  selectively blocking transmission of the light reflected from the real object to the eyes of the viewer under control of the computer means.

16. The method of claim 15, wherein the display device comprises a stereo CRT.

17. The method of claim 15, wherein the steps of reflecting the stereo images to the eyes of a viewer, and transmitting light reflected from the real object comprises the step of positioning a half silvered mirror, such that the mirror forms a substantially forty five degree angle in relation to the display surface of the display device.

18. The method of claim 15, wherein the step of selectively blocking transmission of the light reflected from the real object comprises the step of positioning an LCD array panel adjacent to the reflector means opposite the viewer.

19. The method of claim 15, wherein the step of selectively blocking transmission of the light reflected from the real object comprises the step of selectively blocking transmission of light from the real object on a per pixel basis according to a plurality of alpha values determined by the computer means, wherein each alpha value corresponds to a pixel.

20. The method of claim 19, wherein the computer means determines the alpha values by rending the real object and the virtual object in the virtual coordinate space, and by performing z-buffering on the rendered real and virtual objects.

* * * * *